United States Patent [19]
Chen

[11] Patent Number: 5,991,349
[45] Date of Patent: Nov. 23, 1999

[54] DATA PROCESSING DEVICE

[75] Inventor: Tzang-Kwei Chen, Hsinchu Hsien, Taiwan

[73] Assignee: Winbond Electronics Corp., Hsinchu, Taiwan

[21] Appl. No.: 08/943,359

[22] Filed: Oct. 3, 1997

[30] Foreign Application Priority Data

Jun. 18, 1997 [TW] Taiwan ................................. 86108536

[51] Int. Cl.$^6$ ....................................................... H04L 7/00
[52] U.S. Cl. ........................... 375/355; 375/346; 375/348; 375/365
[58] Field of Search ..................................... 375/229, 232, 375/233, 286, 293, 348, 355, 371, 346, 365; 364/724.19, 724.2

[56] References Cited

U.S. PATENT DOCUMENTS

| | | | |
|---|---|---|---|
| 3,651,316 | 3/1972 | Gibson | 364/724.19 |
| 4,494,242 | 1/1985 | Ehrenbard et al. | 375/371 |
| 5,095,497 | 3/1992 | Aman et al. | 375/254 |
| 5,513,214 | 4/1996 | Gozzo | 375/232 |
| 5,517,527 | 5/1996 | Yu | 375/233 |
| 5,724,397 | 3/1998 | Torsti | 375/355 |

*Primary Examiner*—Stephen Chin
*Assistant Examiner*—Chieh M. Fan
*Attorney, Agent, or Firm*—Ladas & Parry

[57] ABSTRACT

A data processing device that can eliminate interference symbol interference (ISI) of a transmitted data through a timing recovery circuit and ferret out a correct sampling time. It includes an analog-digital converter, a timing recovery device and a sync-word matching filter. The analog-digital converter is used for receiving an analog signal, sampling the analog signal at a sampling frequency, generating a series of sample values, and converting these sample values to a digital signal having a main cursor component, a pre-cursor interference component, and a post-cursor interference component. The post-cursor interference component has a plurality of post-cursor channel response. The timing recovery device is used for eliminating the post-cursor interference component in accordance with the digital signal, while retaining the first post-cursor channel response, and the main cursor component and the pre-cursor interference component to generate an output signal. The sync-word match filter estimates a timing error according to the output signal and adjusts the sampling frequency for optimization.

14 Claims, 5 Drawing Sheets

DATA PROCESSING DEVICE

BACKGROUND OF THE INVENTION

1. Field of the Invention

The present invention relates generally to a data processing device, particularly to a data processing device that erases inter-symbol interference (ISI) of the transmitted data through a timing recovery circuit and extracts a correct sampling time.

2. Description of the Related Art

The growing popularity of data communication and the trend towards user's demand for transmitting audio and video at a very high baud rate have resulted in a great workload for communication network. A promising method is to transmit digital data by using a narrow-band telephone line; however, in existing user-subscribed loop the transmission will be restricted due to inter-symbol interference (thereafter, ISI), if data transmission is undertaken at an extremely high baud rate.

An interface circuit of a user-subscribed loop generally comprises a transmitter and a receiver. In an integrated service digital network (thereafter, ISDN) system, the speed of a U-interfaced transceiver transmits and receives digital data is set at 160 Kb/s, as shown in FIG. 1B. In the transceiver a data frame 310 of 240 bit or 120 baud (including 9 frame sync-words) is formed and then encoded into a pseudo-random bit stream by a scrambler, the bit stream is further converted into a 2B1Q (two binary, one quaternary) code through a 2B1Q encoder according to ANSI Working Group T1E1 standard, and combinations of binary bit 00, 01, 10, 11 are mapped to 4 symbol levels, such as −3, −1, +1, +3. Next, before the signal is delivered to a remote place via a user-subscribed loop, the transmitter will convert the symbol levels into analog pulses with a filter. In the aforementioned frame sync-word SW={sw0, sw1, sw2, sw3, sw4, sw5, sw6, sw7, sw8}={+3, +3, −3, −3, −3, +3, −3, +3, +3}.

The signal outputted to the U-interfaced transceiver is sampled at 80 Kbaud per second, the sampled sample will be processed by the transceiver to extract original digital data, and finally be determined to be 0 or 1 by the DSP, wherein a typical impulse response of transmission channel is shown as in FIG. 1A, the typical impulse response, after being sampled by the transceiver, generates a plurality of h(n) discrete channel response, such as $h_{-2}, h_{-1}, h_0, h_1, h_2, \ldots h_N$, wherein the main pulse is defined as $h_0$, and the peak of the pulse is generally called a main "cursor." Moreover, the channel responses $h_{-1} \sim h_{-2}$ are called pre-cursors, and the gradually decreasing channel responses $h_1 \sim h_N$ with a long tail 10 are called post-cursors. Both of them often create inter-symbol interference to adjacent main pulses. The sampling timing $t_0$ is normally chosen at a time when the peak of the pulse meets a determined value $h_0$, that is, the time when the maximal $h_0$ will be obtained.

Since pulses will lose their fidelity in the transmission process and become fuzzier, thus are difficult for a receiver to detect. The two main causes leading to losing pulse fidelity are, firstly due to the inter-coupling of pulses across the hybrid circuit, and this is a common problem in dual-line system signal transmission commonly known as an echo and is erased with an echo-erasing device in the receiver.

Another cause of losing pulse fidelity is due to ISI, as shown in FIG. 1A. Sometimes, the tail 10 of the impulse response of a fidelity-losing pulse can extend to tens of subsequent main pulses, therefore, ISI occurs when a signal is transmitted at the time of sampling, that is, the signal the receiver receives is more than just the current main cursor component, the sampled result further includes the interference component caused by a pre-cursor and the interference component caused by a tailed post-cursor.

As mentioned above, the sampling timing $t_0$ is normally arranged at the time when the peak of the pulse meets a determined value $h_0$, that is, the time to obtain the maximal $h_0$. But when baud-rate sampling position is not on the peak of the pulse, a timing error will occur. As a result, the probability for a DSP to make wrong decisions on data gets higher; therefore, a timing recovery device is required to correct baud-rate sampling positions. At the phase when the receiver adjusts its coefficient, that is, in the training state, the signal can be delivered to a sync-word matching filter to obtain the value of a timing error and to estimate the timing error from the obtained impulse response. However, the impulse response has a tailed post-cursor that makes the estimate difficult to be precise and is therefore not applicable in a steady state (after the adjustment coefficient of the receiver has been optimized).

SUMMARY OF THE INVENTION

Therefore, an object of the present invention is to provide a data processing device that can eliminate interference symbol interference (ISI) of the transmitted data through a timing recovery circuit and ferret out a correct sampling time.

The present invention achieves the aforementioned object by providing a data processing device connected to a transmission channel having a channel response, for receiving an analog signal carried by the transmission channel. The data processing device primarily comprises an analog-digital converter (ADC), a timing recovery device and a sync-word matching filter. The analog-digital converter samples the analog signal at a sampling frequency, generates a series of sample values, and converts these sample values to a digital signal. Furthermore, the converted digital signal comprises a main cursor component, a pre-cursor interference component, and a post-cursor interference component. Especially, the post-cursor interference component includes a plurality of post-cursor channel responses. The timing recovery device is used for erasing the post-cursor interference component according to the digital signal, while retaining the first post-cursor channel response, the main cursor component and the pre-cursor interference component to generate an output signal. The sync-word matching filter is used for estimating a timing error based on the output signal and adjusting the sampling frequency therewith.

In addition, the sampling frequency is generated by a frequency-generator, which adjusts the sampling frequency according to the timing error.

In addition, the timing recovery device further comprises a linear equalizer, a decision feedback equalizer, a calculating device and a threshold level detecting device. The linear equalizer is coupled to the analog-digital converter to generate a normalized but not equalized signal based on the digital signal. The normalized but not equalized signal includes the main cursor component, the pre-cursor interference component and the post-cursor interference component. Furthermore, the linear equalizer filters out the pre-cursor interference component according to the digital signal to generate a first equalized signal. According to a symbol level, the decision feedback equalizer generates a second signal that is the post-cursor interference component deprived of the first post-cursor channel response. The calculating device, coupled to the linear equalizer and the decision feedback equalizer, is used for subtracting the second signal from the first signal and generating a third signal. The third signal includes the main cursor component, the pre-cursor interference component and the first post-cursor channel response. Furthermore, the calculating device generates a third equalized signal including the main cursor component by subtracting the second equalized signal from the first equalized signal. The threshold level detecting device, coupled to the calculating device, detect the level of the third equalized signal according to a predefined threshold level and compiles it further into a corresponding symbol level, which is output to the decision feedback equalizer. Then the sync-word matching filter, coupled to the calculating device, estimates a timing error in accordance with the third signal to enable the sampling frequency generator to adjust the sampling frequency in accordance with the timing error.

The sync-word match device estimates the timing error according to a timing function, as represented by the following formula:

$$f_e = h_{-1} \alpha h_1$$

where $h_{-1}$ is the first channel response of the pre-cursor interference component, $h_1$ is the first channel response of the post-cursor interference component, $\alpha$ is a constant. In addition, $f_e > 0$ means the main cursor position is on the right, and $f_e < 0$ means the main cursor position is on the left.

BRIEF DESCRIPTION OF THE DRAWINGS

The aforementioned and other objects, features and advantages of the present invention can be more clearly understood with reference to the accompanying drawings from the following detailed description of a preferred embodiment.

DETAILED DESCRIPTION OF THE PREFERRED EMBODIMENTS

Figure 2:
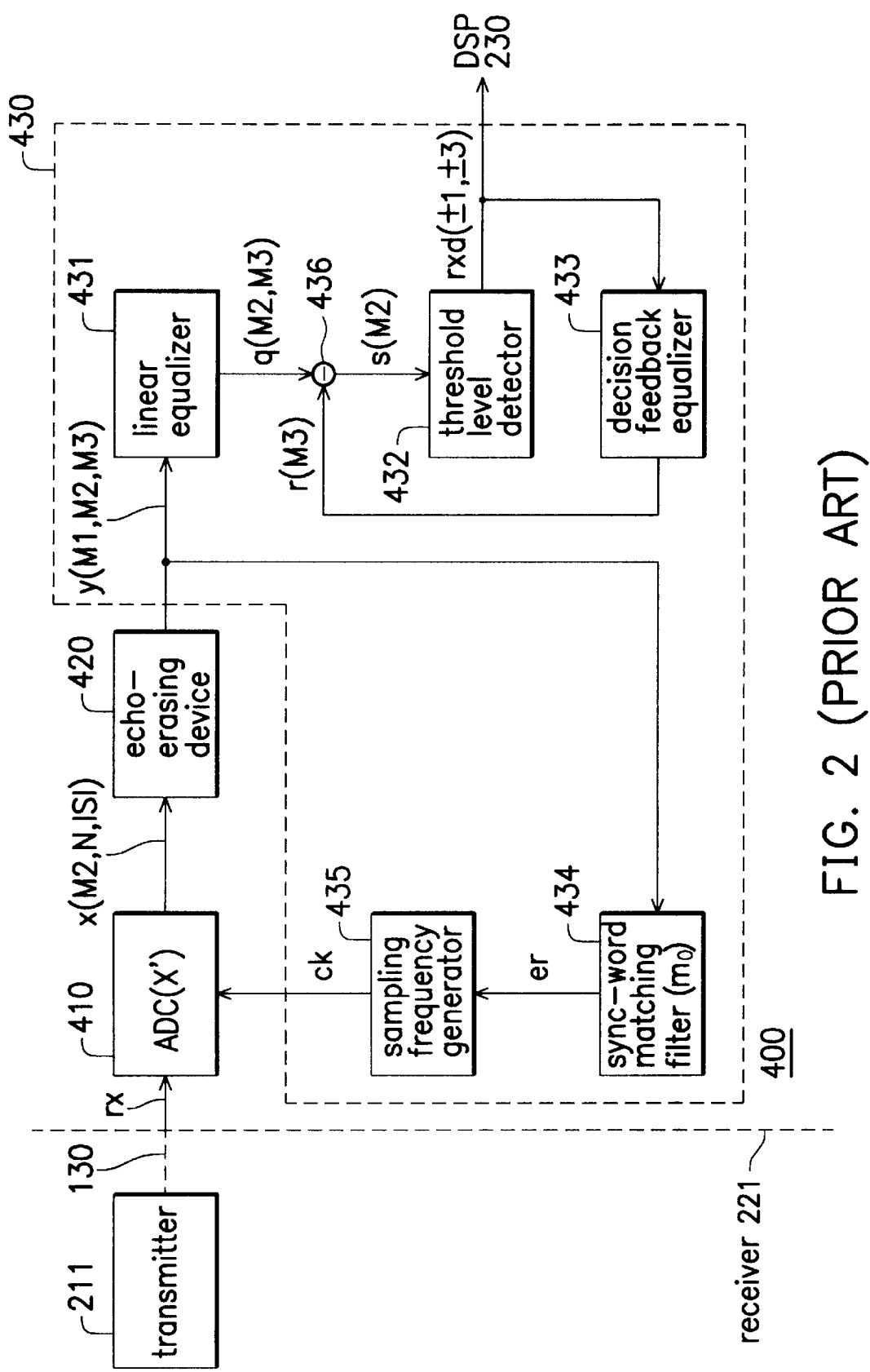
FIG. 2 illustrates a data processing device according to the prior art, in which a conventional timing recovery circuit erases inter-symbol interference in an ISDN U-interfaced transceiver.

Refer now o FIG. 2, an ISDN U-interfaced transceiver in a conventional background structure comprises a transmitter 211 in a telephone company and a receiver 221 at end user, the transmitter 211 maps 2B1Q signals to 4 symbol levels, such as −3, −1, +1, +3. Next, before symbol levels pass through a transmission channel, such as a twisted wire pair subscriber loop 130 to the receiver 221, the transmitter 211 converts these symbol levels into an analog pulse rx.

Inside the receiver 221, it comprises a data processing device 400, wherein an analog converter (A/D) 410 takes samples from the analog signal at a sampling frequency of 80Kbaud, i.e., taking 80K samples per second, thus enabling the receiver 211 to obtain an optimal analog sample x', and to further convert it into a digital signal x. Due to channel impulse response, each of the analog samples x' includes not only the main cursor component M2 of the pulse signal but also mixed interference from adjacent pulse signals, such as inter-symbol interference ISI, that is, interference component M1 caused by a pre-cursor, interference component M3 caused by a post-cursor, and noise N caused by an echo, thus, the converted digital signal x(M2, N, ISI) also comprises the aforementioned components.

An echo erasing device 420 then calculates the estimated value of the noise N caused by the echo and subtracts the output digital signal x from the analog converter (A/D) 410 to generate a signal y(M1, M2, M3).

Since signal y still carries serious inter-symbol interference ISI, therefore, it is expected to sample at the sampling timing $t_0$ position to obtain the maximal signal-to-noise ratio (SNR), that is, the cursor position M2 of the pulse, thus, the interference component M1 of each pre-cursor can be erased with a linear equalizer 431 and the interference component M3 caused by the post-cursor can be erased after being filtered through a decision feedback equalizer 433.

Therein the linear equalizer 431 generates according to signal y(M1, M2, M3) an equalized signal q(M2, M3) with the pre-cursor interference component M1 being erased, the decision feedback equalizer 433 according to an output signal rxd (to be described later) generates an equalized signal r(M3) formed by the post-cursor interference component M3, the equalized signal subtracted with a subtractor 436 is an equalized signal s(M2) having the main cursor component M2 of the pulse signal, the threshold level detecting device 432 according to a predefined threshold level detects the level of the equalized signal s(M2), and compiles the signal into corresponding symbol levels, that is, output signal rxd such as ±1, ±3, and finally DSP 230 will make decisions on the data of the output signals.

Figure 1A:
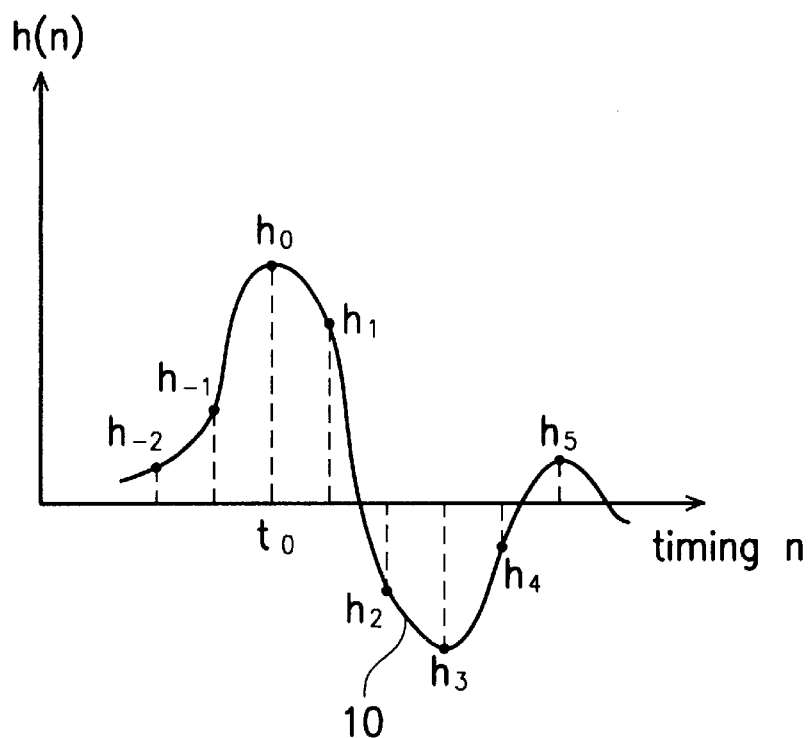
FIG. 1A is a diagram illustrating a typical impulse response generating a plurality of discrete channel responses after sampling through a receiver.
Figure 1B:
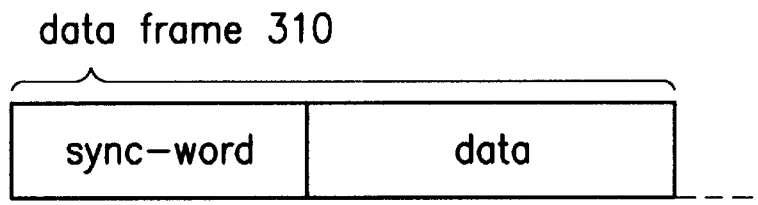
FIG. 1B is a diagram illustrating a frame of data in a transmission.
Figure 1C:
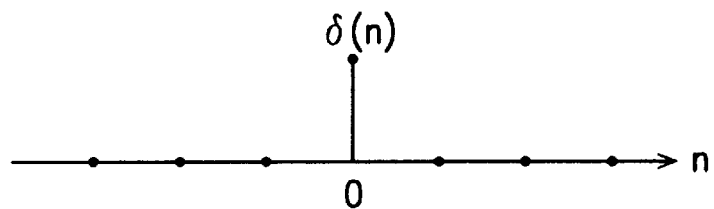
FIG. 1C is a diagram illustrating an impulse function $\delta(n)$.

Further, in the prior art, the method of locating a cursor is to first input in the training state the signal y into a sync-word match filter 434, wherein the sync-word match filter 434 obtains a sync-word SW according to formula (1) and obtains an output $m_0$ according to formula (2) in the following:

$$y = h(n) * SW \tag{1}$$

$$m_0 = y * SW' = h(n) * (SW * SW') \tag{2}$$

where SW' is a coefficient of the sync-word match filter 434. In addition, SW'={sw8, sw7, sw6, sw5, sw4, sw3, sw2, sw1, sw0}, where "*" designates a convolution. Since in an ideal state, the result of (SW*SW') is similar to the impulse function $\delta(n)$ ($\delta(n)=1$ when n=0, and $\delta(n)=0$ when n≠0), as shown in FIG. 1C. Therefore, according to formula (3), an output $m_0$ with an approximate value of the impulse response of h(n) will be obtained.

$$m_0 \tilde{=} h(n) * \delta(n) = h(n) \tag{3}$$

Then a timing error er will be calculated with a timing function as shown in the following:

$$f_e = h_{-1} - \alpha h_1$$

where $\alpha$ is a constant. In addition, $f_e > 0$ means the cursor position is toward the right and $f_e < 0$ means the cursor position is toward the left. Therefore, timing errors can be obtained in this manner; the sampling frequency generator 435 adjusts the sampling frequency accordingly to enable the analog to digital converter (A/D) 410 to obtain the optimal analog to digital sample x' by re-sampling the analog signal rx with the sampling frequency.

However, since the result of (SW*SW') is an approximate value of impulse function δ(n), if the tail 10 of a post-cursor is too long, then the post-cursor interference M3 being caused will possibly cause the value of (SW*SW') to be approximated to 1, even when n≠0. Therefore, the output m, calculated by the sync-word match filter 434 may obtain an imprecise impulse response h(n), and accordingly, cannot calculate the timing error er with the precise values of $h_{-1}$ and $h_1$. Consequently, the correct timing error er is obtained in a steady state and by using a complicated linear estimator in the prior art.

Figure 3:
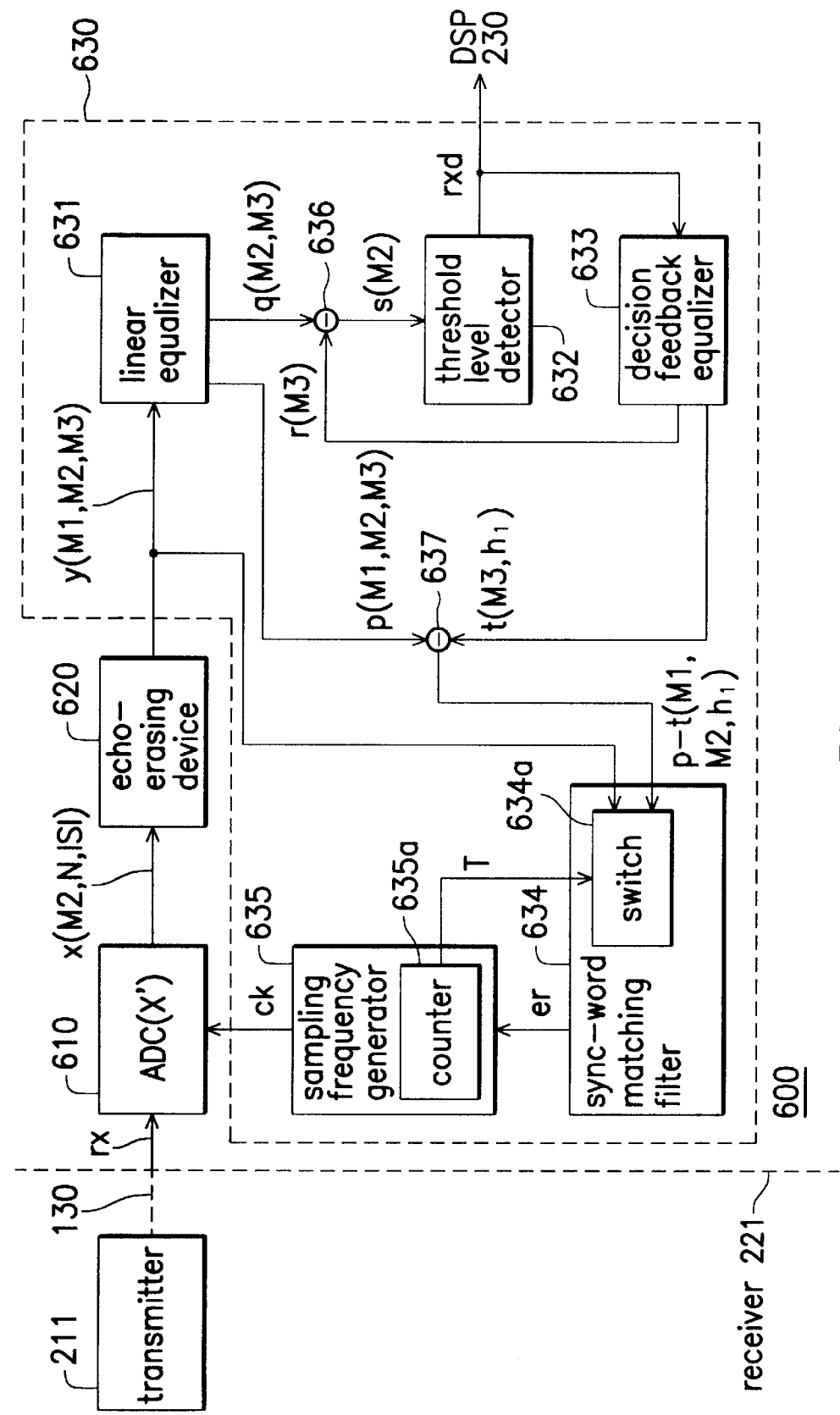
FIG. 3 illustrates a data processing device according to the present invention, in which a timing recovery circuit erases inter-symbol interference in an ISDN U-interfaced transceiver.
Figure 4A:
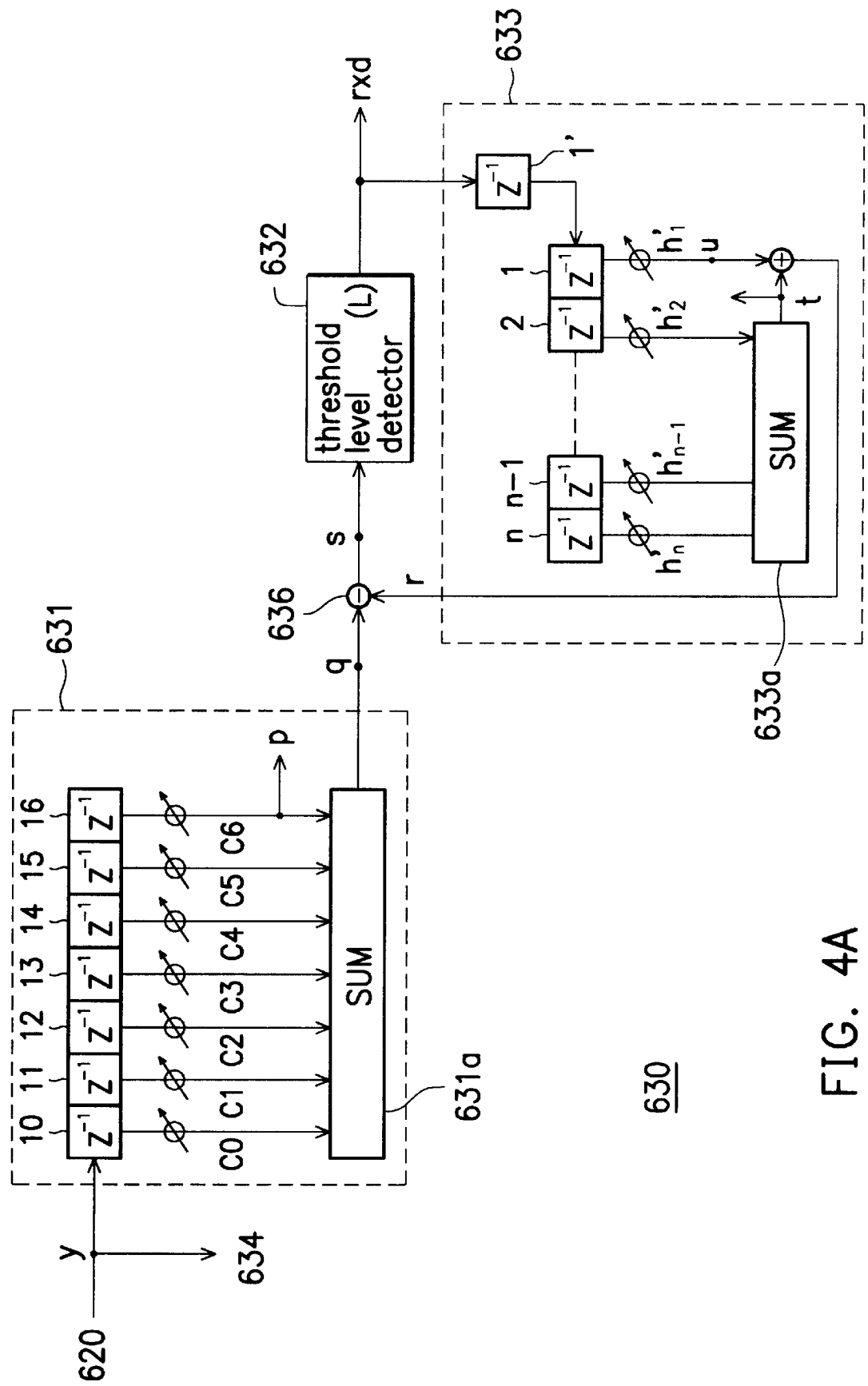
FIGS. 4A and 4B are circuit diagrams illustrating a partial detail of a data processing device of FIG. 3.
Figure 4C:
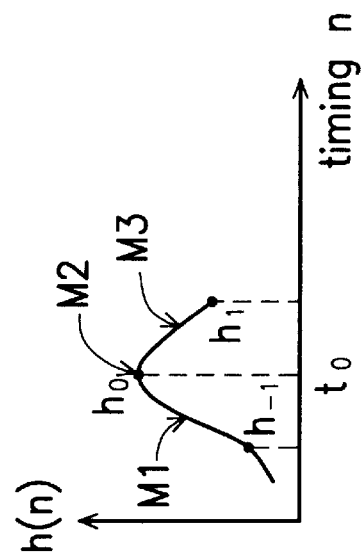
FIG. 4C is a diagram illustrating an output impulse response according to FIG. 4B.
Figure 4B:
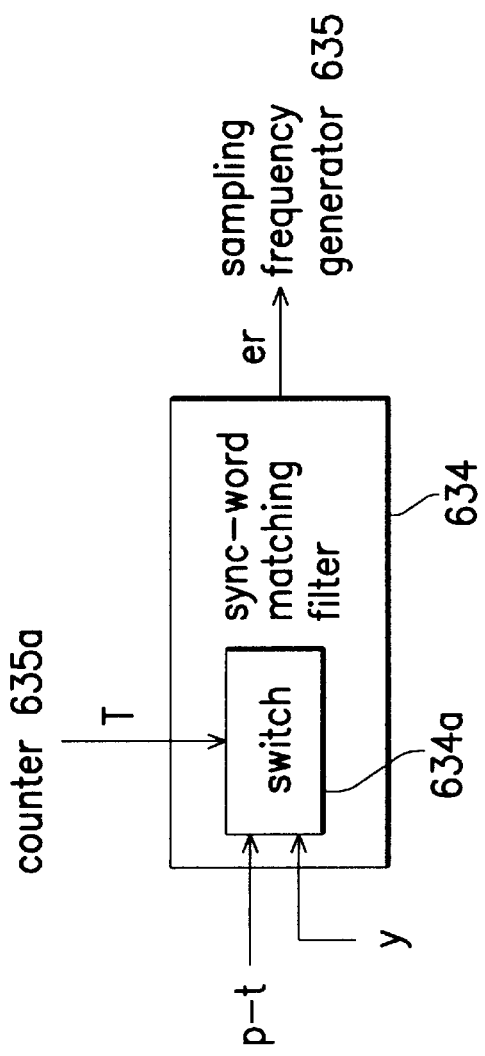

Refer to FIGS. 3, 4A and 4B, wherein the structure of the present invention only needs to use the timing recovery device in the training state to obtain the correct timing error, and needs not to add in the steady state extra device, such as a linear estimator. And FIGS. 4A and 4B are partially detailed circuit diagrams of FIG. 3.

As mentioned above, the transmitter 211 maps 2B1Q signals to 4 symbol levels, such as −3, −1, +1, +3; and further, before symbol levels pass through a transmission route, such as a twisted wire pair subscriber loop 130 to the receiver 221, the transmitter 211 converts those symbol levels into an analog pulse rx. The receiver internally comprises a data processing device 600, wherein an analog converter (A/D) 610 takes samples from the analog signals rx at a sampling frequency ck of 80 K samples per second for the receiver 221 to obtain the optimal analog sample x', and converts it further into a digital signal. Due to channel impulse response, each analog sample x' includes, in addition to the main cursor component M2, other mixed interference components of adjacent pulse signals, such as intersymbol interference ISI, that is, the interference component M1 caused by a pre-cursor, the interference component M3 caused by a post-cursor, and the noise N caused by an echo. Therefore, the converted digital signal x(M2, N, ISI) also includes aforementioned components.

The echo-erasing device 620 subsequently calculates the estimated value of a noise N caused by the echo and generates a signal y(M1, M2, M3) by subtracting the output digital signal x(M2, N, ISI) from the analog converter (A/D) 610.

As shown in FIG. 4A, in the timing recovery device 630, the linear equalizer 631 comprises a series of delayers 10~16 of various levels; each delayer 10~16 is connected to a respective coefficient multiplier C0~C6 to multiply at each level and to accumulate the total to the SUM 631a, the final added-up result is outputted as an equalized signal q(M2, M3) of an erased pre-cursor interference component M1, wherein the result p(M1, M2, M3) of multiplying the delayer 16 with coefficient multiplier C6 being a normalized and un-equalized signal including pre-cursor interference component M1, main cursor component of pulse signal M2, and post-cursor interference component M3.

The decision feedback equalizer 633 comprises a series of delayers of various levels 1', 1, 2, . . . , n−1, n, each delayer 1, 2, . . . , n−1, n, except for delayer 1', is connected to a respective coefficient multiplier $h_1'$, $h_2'$, . . . $h_n'$; also, in order to separate the result u (with channel response $h_1$ component, as shown in FIG. 1a) of delayer 1' and delayer 1 being multiplied by the coefficient multiplier $h_1'$, the result of delayer 2, . . . −1, n multiplying with the connected coefficient multipliers $h_2'$, . . . $h_n'$ will first be accumulated to the adding device SUM 633a, the final output sum total t (that is, removing the post-cursor interference component $h_1$ from the post-cursor channel response component, M3-$h_1$) will then be added up with the result u to generate an equalized signal r(M3) comprising a post-cursor interference component M3, the equalized signal q(M2, M3) generates through a calculating device such as subtracting with the subtracter 636 an equalized signal s(M2) having the main cursor component M2 of a pulse signal. The threshold level detecting device 632 detects the levels of the equalized signals according to a predefined threshold level L, further compiles them into corresponding symbols, that is, output signals rxd, such as ±1, ±3, and DSP 230 undergoes the final data decision on the output signals.

Therein, as shown in the accompanying FIGS. 3 and 4A, through a calculating device such as a subtracter 637, by subtracting the result p(M1, M2, M3) of the delayer $(Z^{-1})$16 multiplying the coefficient multiplier C6 from the final added-up output result t(M3, h1) of delayer 2, . . . n−1, n multiplying with the connected coefficient multiplier $h_1'$, $h_2'$, $h_n'$, since p comprises the pre-cursor interference component M1, the main cursor component M2 of the pulse signal, and post-cursor interference component M3, t is the post-cursor interference component M3-$h_1$ that eliminates the first post-cursor channel response $h_1$. Therefore, p-t is left with the pre-cursor interference component M1 having one or two baud width, the main cursor component M2, and the post-cursor channel response $h_1$ of one-baud width, as shown in FIG. 4C.

At this moment, the result of p-t(M11, M2, $h_1$) is sent to the sync-word matching filter 634, in the training state, since there is no interference component caused by the impulse response of the post-cursor tail (as in FIG. 1), a more precise impulse response h(n) is obtained, moreover, the aforementioned timing function is substituted with a correct value of $h_{-1}$, $h_1$ to calculate the timing error er.

Also, refer to FIGS. 3 and 4B, the sampling frequency generator 635 adjusts the sampling frequency ck according to the timing error er to obtain the optimal sampling frequency, in a time period T, that is when entering into a steady state, since every coefficient value is adjusted to the optimal state, the analog converter (A/D) 610 re-samples from the analog signals with the optimal sampling frequency to obtain the optimal analog sample x'. Therein, by using the counter 635a in the sampling frequency generator 635 to count the timing T of entering into a steady state to control the selecting device such as switch 634a in the sync-word match filter 634, the selecting device chooses to receive digital signal y according to timing T and resumes aforementioned operating procedures, that is, filtering out the sync-word component, to estimate aforementioned channel response.

According to the aforementioned framework, a data processing device 600 can in a steady state use the same timing recovery device 630 to extract an optimal sampling frequency without adding an extra complicated circuit.

The present invention is disclosed using a preferred embodiment as described above, which should not be used to limit the present invention. Those who are skilled in the art are still able to make variations and modifications without being departing from the spirit and scope of the present invention, which is defined by the attached claims.

What is claimed is:

1. A data processing device for receiving an analog signal through a transmission channel, said transmission channel having a channel response, said data processing device comprising:

an analog-digital converter for undertaking sampling from said analog signal at a sampling frequency to generate an analog sample and for generating in response thereto a digital signal comprising a main cursor component, a pre-cursor interference component, and a post-cursor interference component, wherein said post-cursor interference component having a plurality of post-cursor channel responses; and a timing recovery device for erasing said post-cursor interference component, while retaining a first post-cursor channel response, said said main cursor component and said pre-cursor interference component to generate an output signal;

a sync-word matching filter for estimating a timing error based on said output signal and adjusting said sampling frequency herewith.

2. The device as set forth in claim 1, wherein said sampling frequency is generated by a frequency-generator, said frequency-generator adjusts the sampling frequency according to said timing error.

3. The device as set forth in claim 1, wherein said sync-word match device estimates said timing error according to a timing function, as represented by the following formula:

$$f_e = h_{-1} \alpha h$$

where $h_{-1}$ is a first channel response of said pre-cursor interference component, $h_1$ is the first post-cursor channel response of said post-cursor interference component, $\alpha$ is a constant, when $f_e > 0$, it means the main cursor position is on the right, when $f_e < 0$, it means the main cursor position is on the left.

4. The device as set forth in claim 1, wherein said analog signal further comprises the noise caused by an echo.

5. The device as set forth in claim 4 further comprises an echo-erasing device to eliminate said noise caused by said echo of said analog signal.

6. A data processing device used in a receiving terminal in a transceiver for receiving an analog signal through a transmission channel, said transmission channel having a channel response, said data processing device comprising:

an analog-digital converter for undertaking sampling from said analog signal at a sampling frequency to generate an analog sample and for generating a digital signal comprising a main cursor component, a pre-cursor interference component, and a post-cursor interference component, wherein said post-cursor interference component has a plurality of post-cursor channel responses;

a sampling frequency generator for outputting said sampling frequency to said analog-digital converter;

a linear equalizer coupled to said analog-digital converter for generating a normalized but un-equalized first signal according to said digital signal, which includes said main cursor component, said pre-cursor interference component and said post-cursor interference component;

said linear equalizer further filtering said pre-cursor interference component according to said digital signal to generate a first equalized signal;

a decision feedback equalizer for generating according to a symbol level a second signal which comprises said post-cursor interference component with its first post-cursor channel response being eliminated;

said decision feedback equalizer further generating according to said symbol level a second equalized signal comprising said post-cursor interference component;

a calculating device coupled to said linear equalizer and said decision feedback equalizer for subtracting said second signal from said first signal to generate a third signal comprising said main cursor component, said pre-cursor interference component and said first post-cursor channel response;

said calculating device subtracting said second equalized signal from said first equalized signal to generate a third equalized signal comprising said main cursor component;

a threshold level detecting device coupled to said calculating device for detecting according to a predefined threshold level the level of said third equalized signal and converting it into corresponding symbol levels, said symbol levels being outputted to said decision feedback equalizer; and a sync-word matching filter coupled to said calculating device for estimating a timing error in accordance with said third signal to enable said sampling frequency generator to adjust said sampling frequency in accordance with said timing error.

7. The device as set forth in claim 6, wherein said symbol levels are in combinations of ±1 and ±3.

8. The device as set forth in claim 6, wherein said first post-cursor channel response is about one-baud wide.

9. The device as set forth in claim 6, wherein said pre-cursor interference component is about one- or two-baud wide.

10. The device as set forth in claim 6, wherein said calculating device is a subtractor.

11. A data processing device used in a receiver for receiving an analog signal through an ISDN-U interfaced transmission channel, said transmission channel having a channel response, said data processing device comprising:

an analog-digital converter for sampling said analog signal at a sampling frequency to generate a digital signal comprising a sync-word component, a main cursor component, a pre-cursor interference component and a post-cursor interference component, wherein said post-cursor interference component has a plurality of post-cursor channel responses;

a sampling frequency generator for outputting said sampling frequency to said analog-digital converter;

said sampling frequency generator counting for a predefined timing, a training state being defined as within said predefined timing and a steady state being defined after said predefined timing;

a linear equalizer coupled to said analog-digital converter for generating a normalized but un-equalized first signal according to said digital signal comprising said main cursor component, said pre-cursor interference component and said post-cursor interference component;

said linear equalizer filtering said pre-cursor interference component according to said digital signal to generate a first equalized signal;

a decision feedback equalizer for generating according to a symbol level a second signal which comprises said post-cursor interference component with its first post-cursor channel response being eliminated;

said decision feedback equalizer further generating according to said symbol level a second equalized signal comprising said post-cursor interference component;

a first subtracting device coupled to said linear equalizer and said decision feedback equalizer for generating, by subtracting said second signal from said first signal, a third signal comprising said main cursor component, said pre-cursor interference component, and said first post-cursor channel response;

a second subtracting device coupled to said linear equalizer and said decision feedback equalizer for subtracting said second equalized signal from said first equalized signal to generate a third equalized signal comprising said main cursor component; and a threshold level detecting device coupled to said second subtracting device for detecting according to a predefined threshold level the level of said third equalized signal and converting it into corresponding symbol levels, said symbol levels being outputted to said decision feedback equalizer; and a sync-word matching filter coupled to said analog-digital converter and said first subtracting device for estimating in said training state a timing error in accordance with said third signal from said first subtracting device to enable said sampling frequency generator to adjust said sampling frequency in accordance with said timing error, and for filtering in the steady state said sync-word component and for estimating channel response in a accordance with the digital signal from said analog-digital converter.

12. The device as set forth in claim 11, wherein said sampling frequency generator further comprises a counter for generating said predefined timing.

13. The device as set forth in claim 12, wherein said sync-word matching filter further comprises a selecting device for selecting received signals according to said predefined timing to receive said third signal in said training state and to receive said digital signal in said steady state.

14. The device as set forth in claim 13, wherein said selecting device is a switch.

* * * * *